Oct. 15, 1968  N. O. ROSAEN  3,405,804
HORIZONTALLY MOUNTED BAYONET FILTER DEVICE
Original Filed Nov. 16, 1964  2 Sheets-Sheet 1

INVENTOR
NILS O. ROSAEN

BY  *Hauke & Hauke*

ATTORNEYS

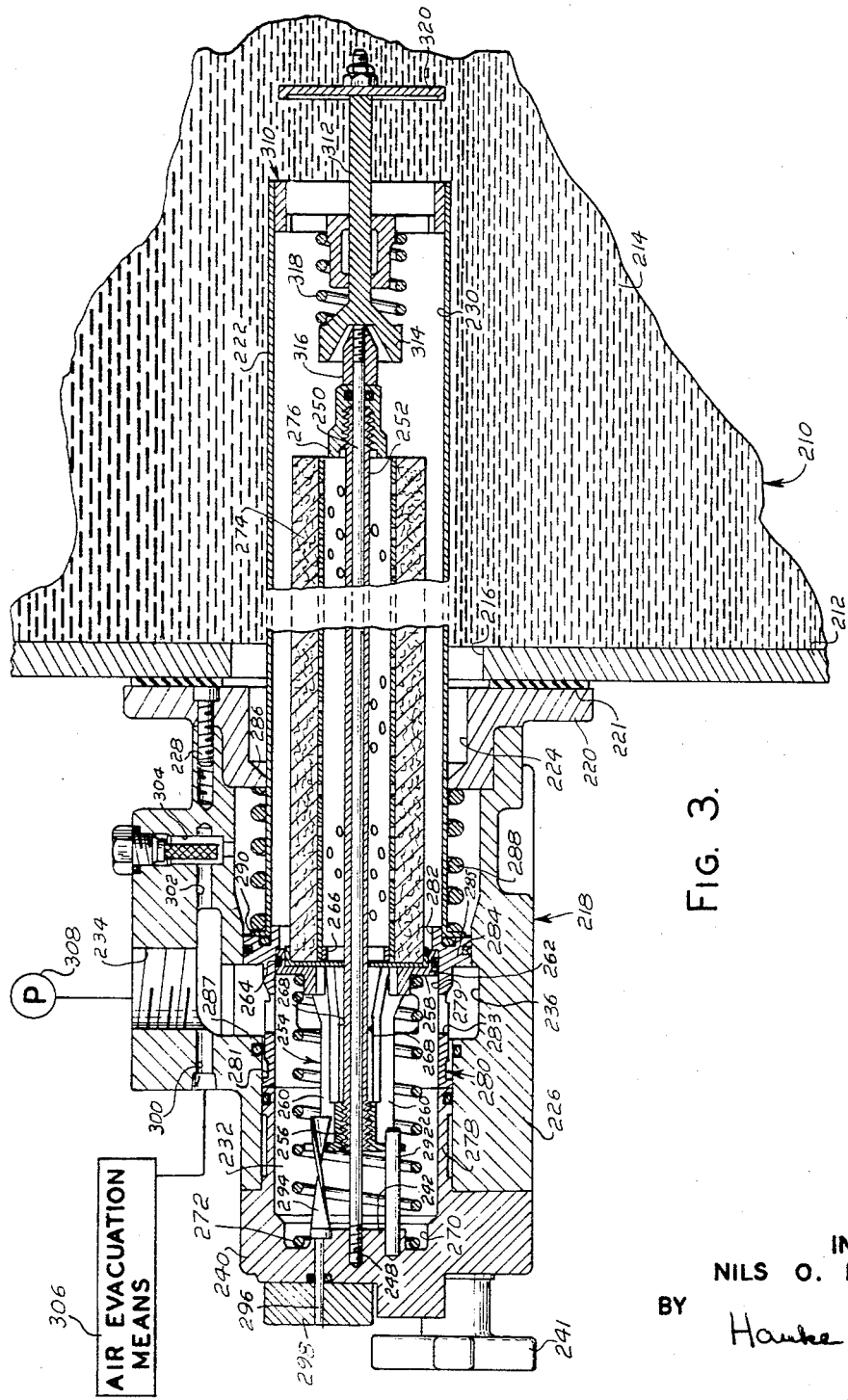

United States Patent Office

3,405,804
Patented Oct. 15, 1968

3,405,804
HORIZONTALLY MOUNTED BAYONET FILTER DEVICE
Nils O. Rosaen, Bloomfield Hills, Mich., assignor to The Rosaen Filter Company, Hazel Park, Mich., a corporation of Michigan
Continuation of application Ser. No. 411,246, Nov. 16, 1964. This application Dec. 29, 1967, Ser. No. 701,519
8 Claims. (Cl. 210—90)

ABSTRACT OF THE DISCLOSURE

A filter horizontally mounted on the sidewall of a reservoir and including valve means which closes automatically upon removal of the filter element from the reservoir.

*Cross reference to related application*

This application is a continuation of application Ser. No. 411,246, filed Nov. 16, 1964, now abandoned.

*Prior art*

Certain of my applications Ser. Nos. 340,365 and 341,488, each filed on Jan. 27, 1964, and now both abandoned in favor of continuation-in-part application Ser. No. 562,417, filed June 8, 1966, and which issued as U.S. Patent No. 3,313,417 on Apr. 11, 1967, disclose certain new mobile or bayonet filter devices which are adapted to be inserted into the reservoir of fluid systems. These new filter devices have the particular advantage that much of the housing structure heretofore necessary for filter devices is eliminated. This produces a substantial reduction in manufacturing costs for such devices. Further, the filter devices are readily accessible for removal of the filter element for cleaning or replacement and means are provided for bypassing the filter element when it reaches a predetermined clogged condition. Indicating means are provided exteriorly of the devices for indicating the condition of the filter element.

These filter devices have proven to be quite satisfactory. To prevent fluid from escaping from the fluid reservoir during cleaning or replacement of the filter element, however, it has been heretofore necessary to position the filter devices to extend through the top plate of the fluid reservoir. To take advantage of the pressure head produced within the fluid reservoir itself, it is desirable to mount such filter devices to extend horizontally into the fluid reservoir through one of the side walls thereof. With the filter devices of the aforementioned patent this is not possible since upon removal of the filter element for cleaning or replacement fluid would readily escape from the fluid reservoir through the disassembled filter device.

*Summary of the present invention*

The present invention provides a bayonet or mobile type filter device having all of the advantages of the filter devices of my aforementioned patent. Like those filter devices, the filter device of the present invention is constructed of a tubular housing positioned to extend into a fluid reservoir with an inlet end disposed within the reservoir and an outlet end disposed exteriorly thereof. To permit the filter device of the present invention to be installed in a horizontal position extending through one of the side walls of the fluid reservoir, inlet valve means are provided which are operable to automatically close the inlet end of the tubular housing upon disassembling of the device for removal of the filter element for cleaning and/or replacement.

It is an object then of the present invention to improve filter devices such as those disclosed in my aforementioned patent by providing an improved construction which permits the filter device to be inserted horizontally through a side wall of a fluid reservoir.

It is another object of the present invention to permit mobile or bayonet filter devices of the type disclosed in my aforementioned patent to be mounted in a horizontal position extending through one of the side walls of a fluid reservoir by providing means automatically operable to close the inlet end of the fluid device upon removal of the filter element for cleaning and/or replacement.

*Description of the drawings*

Still further objects and advantages of the present invention will readily occur to one skilled in the art to which the invention pertains upon reference to the following drawings in which like reference characters refer to like parts throughout the several views and in which:

FIG. 3 is a longitudinal cross-sectional view similar to FIG. 1 but illustrating another preferred embodiment of the present invention.

*Description of a preferred embodiment*

Figure 2:
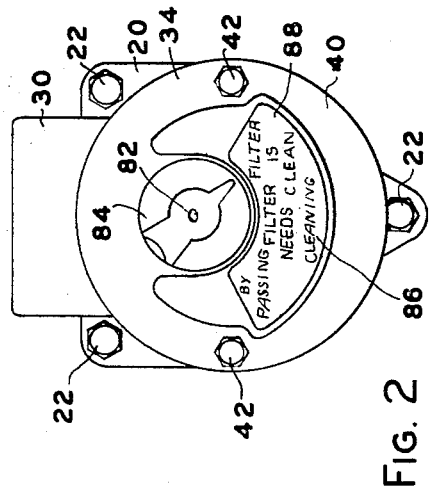
FIG. 2 is a fragmentary elevational end view of FIG. 1.
Figure 1:
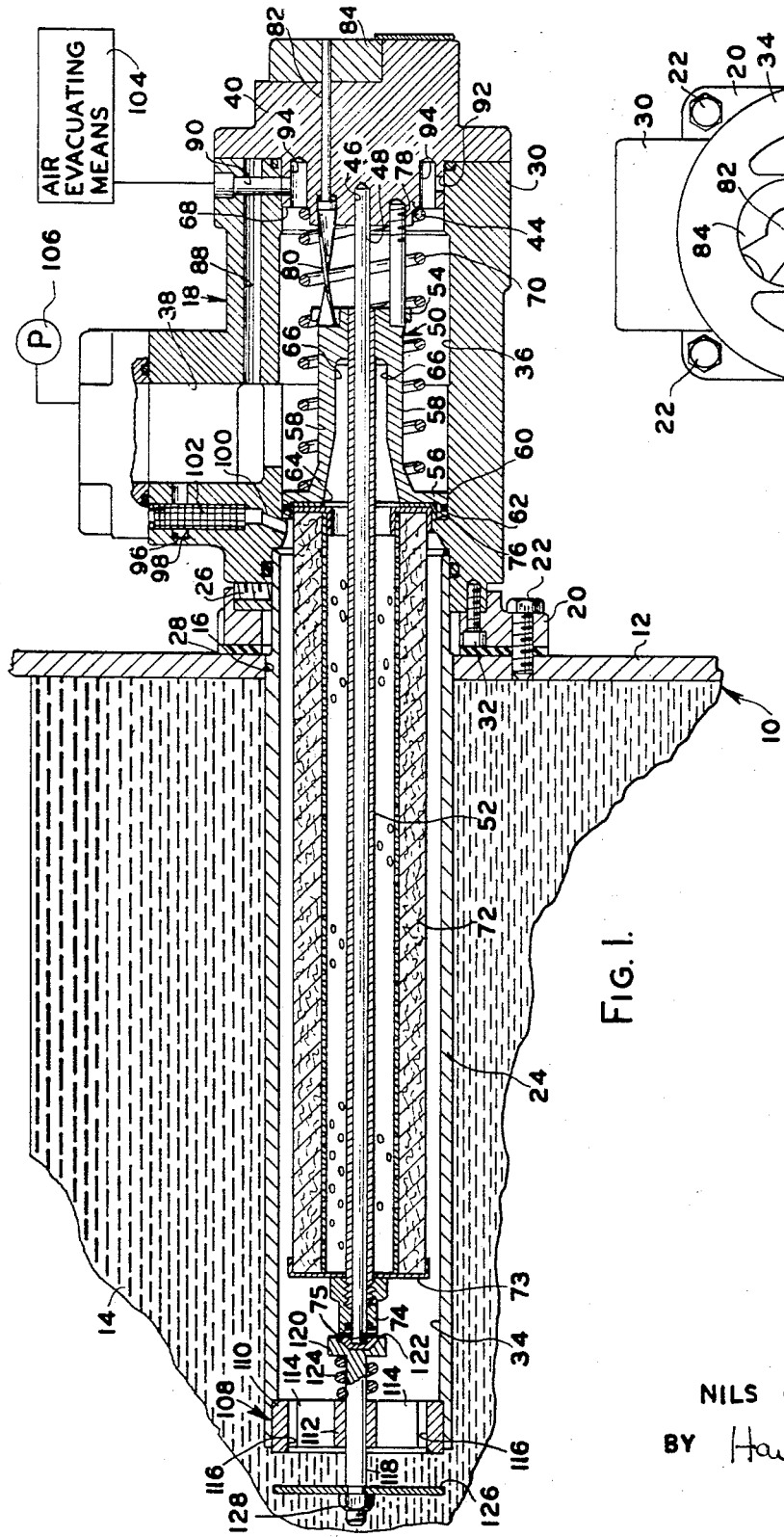
FIG. 1 is a longitudinal cross-sectional view of one preferred filter device of the present invention and illustrating diagrammatically several preferred components of a fluid system connected to the preferred filter device.

Now referring to the drawings for a more detailed description of the present invention, FIGS. 1 and 2 illustrate one preferred embodiment of the invention as comprising a fluid reservoir generally indicated at 10 with only a portion thereof being shown. The fluid reservoir 10 comprises a side wall 12 and is at least partially filled with a suitable fluid 14. An opening 16 is provided in the side wall 12. One preferred filter device is generally indicated at 18 and includes a mounting member 20 secured to the side wall 12 by any convenient means such as bolts 22. A tubular housing member 24 extends horizontally through the opening 16 provided in the side wall 12 and into the interior of the fluid reservoir 10. The tubular member 24 is preferably positioned below the minimum level of fluid 14 in the reservoir 10. A gasket 28 is provided between the mounting member 20 and the side wall 12.

The filter device 18 preferably further comprises a housing member 30 closing the exterior end of the tubular housing member 24 and secured thereto by a plurality of annularly spaced bolts or screws 26. The housing member 30 is preferably secured to the mounting member 20 by screws 32. The tubular housing member 24 forms a filter chamber 34 and the housing member 30 forms an outlet chamber 36 communicating with the filter chamber 34. The housing member 30 is provided with an outlet 38 opening radially to the outlet chamber 36.

A cap member 40 is preferably secured to the housing member 30 by any convenient means such as bolts or screws 42 as can be seen in FIG. 2 and closes the outlet chamber 36. The cap member 40 is provided with a boss portion 44 extending into the housing member 30 and having an axially positioned threaded recess 46 which provides the means for carrying the threaded end of an elongated rod member 48. The rod member 48 extends axially through the outlet chamber 36 and the filter chamber 34 and terminates short of the inlet end of the tubular housing member 24 as shown. A porting member 50 is axially slidably mounted on the rod member 48 by means of an elongated tubular member 52 which encompasses the rod member 48 and which is fixed to the porting member 50 to be axially slidable therewith along the rod member 48. The porting member 50 comprises an outer substantially annular radially extending portion 54 and an inner annular radially extending portion 56 joined by a plurality of axially extending legs 58. The outer portion 56 is provided with a peripheral axially extending flange 60 which carries a piston ring 62 engaging the inner wall of housing 30 and a central opening 64 commuicating with the filter chamber 34. The legs 58 define a plurality of annularly spaced slots 66 providing communication between the central opening 64 and the outlet 38 through the outlet chamber 36.

The boss portion 44 of cap member 40 is further provided with an annular recessed portion 68 which forms a seat for one end of a spring 70. The other end of the spring 70 is seated against the annular portion 56 of porting member 50 and urges the porting member 50 axially away from the cap member 40.

The rod member 48 and the tubular member 52 extend axially through the central opening 64 of porting member 50 and into the filter chamber 34. A substantially cylindrical filter element 72 is fixed to the tubular member 52 by means of a closure plate 73 and a nut member 74 received by the threaded free end of the tubular member 52. Tightening the nut member 74 urges the filter element 72 axially against the portion 56 of porting member 50 to securely lock the filter element 72 and the porting member 50 one to the other.

It is apparent that as the invention has thus far been described the porting member 50, the tubular member 52 and the filter element 72 are mounted to move axially along the rod 48 and are normally maintained in the position illustrated in FIG. 1 by means of the spring member 70 urging the assembly against a stop portion 76 formed in the housing member 30.

The portion 54 of porting member 50 is slotted to receive a guide pin 78 fixed to the cap member 40 and an actuator element 80. The actuator element 80 is twisted about its longitudinal axis and is secured to a shaft 82 which is in turn secured to a pointer element 84 carried exteriorly of a cap member 40 so that axial movement of the actuator element 80 produces a corresponding rotational movement of the shaft 82 and the pointer element 84. The pointer element 84 rotates with the shaft 82 and as can best be seen in FIG. 2, points to suitable indicia 86 as provided on an indicator plate 88 provided on the exterior surface of the cap member 40. It is apparent then that upon axial movement of the porting member 50, the tubular member 52, and the filter assembly 72, the actuator element 80 engages in the slot provided in the portion 54 of porting member 50 to produce a corresponding rotation of the shaft 82 and the pointer element 84 so that with suitable indicia 86 provided on the exterior surface of the cap member 40 the axial position of the porting member 50 will be indicated by the pointer element 84.

The housing member 30 is provided with an axially extending recess 88 communicating at one end with the outlet 38 and at the other end with a radially extending air outlet passage 90. The passage 90 extends radially inwardly to communicate with an annular recess 92 formed in the cap member 40. The recess 92 communicates with a plurality of annularly spaced axially extending passages 94 registering with the outlet chamber 36. The housing member 30 is also provided with a second axially extending passage 96 registering at one end with the outlet 38 and at the other end with a radially extending passage 98. The passage 98 communicates with an annularly disposed passage 100 which registers with the filter chamber 34 on the inlet side of the filter element 72 at a point closely adjacent the portion 56 of porting member 50. A filter means 102 is carried in the passage 98. An air evacuation means 104 is connected with passage 90 and a fluid pump 106 is connected to the outlet 38.

The operation of the fluid system as it has thus far been described is as follows:

Fluid is normally pumped by the pump 106 from the reservoir 10 into the filter chamber 34 and is directed radially inwardly through the filter element 72 axially through the central opening 64 and the slots 66 provided in porting member 50, through the outlet chamber 36 and out the outlet 38.

As the filter element 72 becomes clogged an increase in the pressure differential across the element will be produced. Since the portion 56 of porting member 50 is exposed on one side to pressure on the outlet side of the filter element 72 and on the other side to pressure on the inlet side of the filter element 72 when the increased pressure differential reaches a value sufficient to overcome the force exerted by the spring member 70, the porting member 50, the filter element 72, and the tubular member 52 will move axially together toward the cap member 40. As heretofore pointed out, each change in the axial position of the porting member 50 will produce a corresponding change in the position of the pointer element 84. Thus with proper indicia 86 provided on the indicator plate 88, the clogged condition of the filter element 72 will be visibly indicated exteriorly of the filter device 18.

As the filter element 72 continues to become clogged, and prior to the danger of the increased pressure differential across the element 72 causing the same to rupture, the porting member 50 will have moved axially sufficiently to open a fluid path directly from the inlet side of the filter element 72 past the flange portion 60 of annular member 56 to the outlet 38.

When it is desired to remove the filter element 72 for cleaning or replacement, the cap member 40 is removed to remove the rod member 48. Since the porting member 50 and filter element 72 are sceured one to the other and are prevented from falling off the end of the rod 48 by a nut member 75, these elements will be removed with the cap member 40 and the filter element 72 then can be readily cleaned and/or replaced.

After the filter element 72 has been cleaned or replaced and is installed with the porting member 50, the tubular member 52 and the rod member 48 back into the filter device 18, the air evacuation means 104 is actuated to remove air trapped in the outlet chamber 36 by means of passage 94, recess 92 and passage 90 and also to remove trapped air from the filter chamber 34 on the inlet side of the filter element 72 by means of passages 100, 98, 86, outlet 38, and passages 88 and 90.

During the operation of the filter system the pump 106 causes air which would otherwise become entrapped in the filter housing 30 to be drawn from the upper portion of filter chamber 36 through the passages 94, recess 92, the passage 90, and the passage 88 out the outlet 38. Further, air which would normally become entrapped in the upper portion of the filter chamber 34 on the inlet side of the filter outlet 72 will be drawn by the pump 106 through the passages 100, 98 and 96 and out the outlet 38. The filtering member 102 insures that any fluid that may bypass the filter element 72 with entrapped air during operation of the system will become filtered before passing through the outlet 38.

What has thus far been described has been described and claimed in certain of my copending applications. The present invention comprises an improvement which will now be described in detail.

Referring again to FIG. 1 a valve seat member 108 is carried at the interior end of the tubular housing member 24 and comprises an axially extending outer annular portions 110 secured to the interior wall of the tubular housing member 24 and an inner annular portion 112 secured to the outer annular portion 110 by a plurality of radially extending connecting members 114. The connecting members 114 form a plurality of annularly spaced openings 116 which provide communication between the fluid reservoir 10 and the filter chamber 34. A plunger member 118 is axially slidably carried by the inner annular portion 112. The plunger member 118 is provided with an enlarged head portion 120 having a recess 122 adapted to receive the nut member 75 carired by the rod 48. A spring member 124 biased between the inner annular portion 112 of the valve seat member 108 and the enlarged head portion 120 of plunger member 118 urges the plunger member 118 axially against the nut member 75. A valve member 126 is carried at the interior end of the plunger 118 by a nut member 128.

With the filter assembly in the position illustrated in FIG. 1, the rod 48 and the nut member 75 urge the plunger member 118 against the force of the spring 124 and into a position in which the valve 126 is axially spaced from the valve seat member 108. Since the rod 48 does not move during operation of the filter device as long as the cap 40 is in place, the valve member 126 will remain axially spaced from the valve seat member 108 so that fluid from the reservoir 10 can be drawn through the slots 116 in the valve seat member 108 and into the filter chamber 34.

Upon removal of the cap member 40 for cleaning or replacement of the filter element 72 the nut members 75 and the rod 48 will be moved axially away from the head portion 120 of the plunger 118 to permit the spring 124 to urge the plunger 118 axially toward the cap member 40 to close the valve member 126 against the valve seat member 108 and to thereby close the slots 116 to prevent fluid from entering the filter chamber 34. Thus as the filter device 18 is being disassembled, fluid will be prevented from escaping from the reservoir 10 out the open end of the housing 30. This permits the filter device 18 to be used in the horizontal position illustrated so that advantage can be taken of the pressure head produced by the fluid 14 within the reservoir 10.

FIG. 3 illustrates another preferred embodiment of the present invention somewhat similar to the embodiment described with reference to FIGS. 1 and 2 and comprises a filter device 218 adapted to be mounted through an enlarged opening 216 provided in one of the side walls 212 of a fluid reservoir generally indicated at 210, with only a portion thereof being shown. Again the fluid reservoir 210 is preferably at least partially filled with a suitable fluid 214.

The filter device 218 preferably includes a mounting member 220 secured to the side wall 212 by any convenient means such as bolts (not shown). A gasket 221 prevents fluid leakage from the reservoir 210 past the mounting member 220. An elongated tubular housing member 222 extends axially through an opening 224 provided in the mounting member 220 and through the opening 216 provided in the side wall 212 into the reservoir 210.

The filter device 218 preferably further comprises a housing member 226 closing the exteriorly positioned end of the tubular housing member 222 and secured to the mounting member 220 by a plurality of bolts or screws 228. The tubular housing member 222 forms a filter chamber 230 and the housing member 226 forms an outlet chamber 232 in communication with the filter chamber 230. The housing member 226 is provided with an outlet 234 opening radially to the outlet chamber 232 through a substantially annular chamber 236.

A cap member 240 is preferably secured to the housing member 226 by a plurality of bolts or screw members 241 and closes the outlet chamber 232. The cap member 240 is provided with a boss portion 242 extending into the housing member 226 and having an axially threaded recess 248 adapted to carry the threaded end of an elongated rod member 250. The rod member 250 extends axially through the outlet chamber 232 and the filter chamber 230 and terminates short of the free end of the tubular housing 222 as illustrated.

An elongated tubular member 252 is axially slidably carried on the rod member 250. A porting member 254 is provided with an outer annular portion 256 secured to the tubular member 252 and an inner annular portion 258 connected to the outer annular portion 256 by a plurality of substantially axially extending leg members 260. The inner annular portion 258 is provided with an axially extending flange portion 262 which carries a piston ring seal 264. The inner annular portion 258 is further provided with a central opening 266 through which the tubular member 252 and the rod 250 extend and provides communication with the filter chamber 230. The legs 260 define a plurality of annularly spaced slots 268 which provide communication between the central opening 266 and the outlet chamber 232.

The cap member 240 is further provided with an annular recess 270 which forms the seat for one end of a spring member 272. The opposite end of the spring member 272 is seated against the inner annular portion 258 of porting member 254 so that the spring member 272 urges the tubular member 252 and the porting member 254 axially away from the cap member 240.

A substantially cylindrical filter element 274 is urged against the inner annular flange portion 258 of porting member 254 by means of a nut member 276 received by the threaded free end of the tubular member 252. Thus it is apparent that the porting member 254, the tubular member 252 and the filter element 274 are free to move axially toward the cap member 240 in response to changes in the pressure differential across the filter element 274 substantially as described above with reference to FIGS. 1 and 2.

The cap member 240 is further preferably provided with an axially extending annular flange 278 forming a cylinder and extending into the outlet chamber 232 closely adjacent to the periphery of the inner wall of the housing member 226. The axially extending flange portion 262 of the inner annular portion 258 of porting member 254 is movable axially on a guide surface 279 formed in a valve member 280 carried in the outlet chamber 232. The piston ring 264 engages the guide surface 279 to prevent fluid leakage between the porting member 254 and the valve member 280. The valve member 280 is provided with an axially extending annular portion 281 which extends intermediate the porting member 254 and the housing member 226. One end of the valve member 280 is formed with a radially inwardly extending flange 282 which forms the seat for the axially extending flange portion 262 of the porting member 254. A piston ring seal 284 prevents fluid leakage between the housing member 226 and the valve member 280. The opposite end of the valve member 280 is seated against the free edge of the axially extending annular flange portion 278 of the cap member 240.

The mounting member 220 is provided with a scalloped, radially extending flange portion 286 which forms the seat for one end of a spring member 288. The tubular housing member 222 is provided at its exterior end with a radially outwardly extending flange portion 290 which is adapted to seat against the valve member 280. The spring member 288 engages the flange portion 290 of the tubular housing member 222 and urges the tubular housing member 222 against the valve member 280 and the valve member 280 in turn against the free edge of the annular portion 278 of the cap member 240. In this manner, the tubular housing member 222 is carried by the housing member 226 in a position extending horizontally into the fluid reservoir 210.

The outer annular portion 256 of porting member 254 is slotted to receive a guide pin 292 carried by the cap member 240, and an actuator element 294. The actuator element 294 is substantially similar to the actuator element described above and is secured to a shaft 296 which is in turn secured to a pointer element 298 carried exteriorly of the cap member 240.

The operation of the filter device of FIG. 3 as it has thus far been described is substantially similar to that described above. The porting member 254, the tubular member 252 and the filter element 274 are operable to move axially along the rod 250 in response to changes in the pressure differential across the element 274. Upon an increase in the pressure differential across the element 274 the actuator element 294 will be rotated to produce a corresponding rotation of the pointer element 298 so that a visible indication of the condition of the filter element 274 can be provided exteriorly of the filter device. The filter device of FIG. 3 is also operable to open a bypass path around the filter 274 when the filter element 274 reaches a predetermined clogged condition. Movement of the porting member 254 axially against the spring 272 will open a fluid path between the axially extending flange portion 262 and the valve member 280 through a plurality of annularly spaced slots 283 provided in the valve member 280.

Air evacuation passages 300, 302, 304 are also provided in the filter device of FIG. 3. These passages in combination with an air evacuating means 306 and a pump 308 operate to bleed entrapped air from the filter device substantially as described above with reference to FIGS. 1 and 2.

Like the embodiment described above the device of FIG. 3 is also provided with a valve seat member 310 carried on the interior end of the tubular housing member 222. A plunger 312 is axially slidably carried by the valve seat member 310 and is provided with an enlarged head portion 314 adapted to be actuated by a nut member 316 carried on the free end of the elongated rod 250. A spring member 318 urges the plunger 312 against the nut member 316. A valve member 320 is carried by the free end of the plunger member 312 and is operable to be moved to a position closing the inlet end of the tubular housing 222 upon the rod member 250 being moved axially away from the enlarged head 314 of the plunger member 312 substantially as described above.

In operation then of the device illustrated in FIG. 3, if the filter element 174 becomes so clogged as to require changing or cleaning, the bolts or nuts 241 are removed to remove the cap member 240. As the cap member 240 is moved axially away from the housing 226 the porting member 254, the tubular member 252, and the filter element 274 will be moved by the rod 250 and the nut member 316 axially from the filter device 218. Movement of the rod 250 and the nut member 316 will of course close the valve member 320 to close the inlet end of the tubular housing member 222 and thus prevent fluid from entering the filter chamber 230 substantially as described above.

The valve member 280 is provided to permit continued operation of the fluid system during those times when the filter element 274 is being removed for cleaning and/or replacement. As the cap member 240 is moved axially away from the housing member 226 the annular portion 278 of the cap member 240 is moved axially away from the valve member 280 to permit the spring member 288 to urge the tubular housing member 222 and the valve 280 into a position in which a complementarily formed surface of the valve 280 engages an annular seat 287 formed in the housing member 226. With the valve member 280 in this position, fluid is drawn by the pump 308 through the enlarged opening 216 provided in the side wall 212, through the opening 224 provided in the mounting member 220, past the scalloped flange portion 286 of the mounting member 220, and past the flange 282 of the valve member 280 to the outlet 234. In this way a path is opened directly from the fluid reservoir 210 to outlet 234 of the filter device 218 whenever it is desired to remove the cap 240 for purposes of cleaning or replacing the filter element 274.

It is apparent that the preferred embodiments described above afford substantial advantages over the filter devices of my aforementioned patent. By providing the inlet check valve means, it is now possible to utilize filter devices like those heretofore disclosed in a horizontal position extending through one of the side walls of the fluid reservoir since the check valve means prevents fluid leakage from the filter devices when the filter element is being removed for purposes of cleaning or replacement. This permits the utilization of the pressure head produced by the fluid within the reservoir.

It is also apparent that although I have described but several embodiments of my invention many changes and modifications can be made therein without departing from the spirit of the invention as expressed by the scope of the appended claims.

I claim:
1. In a fluid system having a fluid reservoir, a filter device comprising,
 (a) a tubular member having an inlet end and an open end opposite said inlet end, said tubular member being carried by the side walls of the fluid reservoir in a horizontal position having said inlet end disposed below the level of fluid in the reservoir and said opposite end in a position exteriorly of said reservoir,
 (b) a housing structure, means mounting said structure exteriorly of said reservoir and closing the open end of said tubular member and having an outlet,
 (c) a filter assembly comprising a tubular filter element carried in said tubular member intermediate said inlet end of said tubular member and said outlet of said housing structure,
 (d) an elongated rod member carried by said housing structure and extending axially through said tubular member to a point adjacent the inlet end thereof,
 (e) means axially slidably mounting said filter element to said rod member,
 (f) a valve member carried by said tubular member adjacent the inlet end thereof and having a plunger portion normally engaged by said rod member to maintain said valve member in an open position,
 (g) means urging said valve member to a position closing said inlet end of said tubular member upon axial movement of said rod member away from said inlet end of said tubular member, said filter assembly further comprises pressure responsive means operable to axially move said filter element along said rod member in response to changes in the pressure differential across said filter element and a valve means operable to open a bypass path around said filter element upon said filter element being moved axially by said pressure responsive means to a predetermined axial position.

2. The system as defined in claim 1 and including a second valve means operable to open a fluid path directly from said reservoir to said outlet upon said filter being removed from said tubular member.

3. The fluid system as defined in claim 1 and including an indicator means carried by said housing structure and operably connected through said filter element to indicate the axial position thereof.

4. The filter system as defined in claim 1 and including,
 (a) said side wall being provided with an opening through which said tubular member extends,
 (b) said filter device being further provided with means defining a fluid path from said reservoir through said opening bypassing said filter element and to said outlet, and
 (c) a second valve means normally operable to close said fluid path and means actuating said second valve means to a position opening said fluid path upon removal of said filter assembly from said tubular member.

5. In a fluid system having a fluid reservoir, a filter device comprising,
 (a) a tubular member having an inlet end and an open end opposite said inlet end, said tubular member being carried by the side wall of the fluid reservoir in a horizontal position having said inlet end disposed below the level of fluid in the reservoir and said opposite end in a position exteriorly of said reservoir,
 (b) a housing structure, means mounting said structure exteriorly of said reservoir and closing the open end of said tubular member and having an outlet, (c) a filter assembly comprising a tubular filter element carried in said tubular member intermediate said inlet end of said tubular member and said outlet of said housing structure, (d) an elongated rod member carried by said housing structure and extending axially through said tubular member to a point adjacent the inlet end thereof, (e) means axially slidably mounting said filter element to said rod member with the end of said rod member extending beyond the end of said filter element, (f) a valve member carried by said tubular member adjacent the inlet end thereof and having a plunger portion normally engaged by said rod member to maintain said valve member in an open position when said filter assembly is carried in a mounted position by said rod member within said tubular member, (g) means urging said valve member to a position closing said inlet end of said tubular member upon the axial movement of said filter assembly and said rod member away from said inlet end of said tubular member.

6. The system as defined in claim 5 and including a second valve means operable to open a fluid path directly from said reservoir to said outlet upon said filter assembly being removed from said tubular member.

7. The system as defined in claim 5 and including an indicator means carried by said housing structure and operably connected to said filter element to indicate the axial position thereof.

8. The system as defined in claim 5 and in which, (a) said reservoir is provided with an opening through which said tubular member extends, (b) said filter device is further provided with means defining a fluid path from said reservoir through said opening bypassing said filter element and to said outlet, and (c) a second valve means normally operable to close said fluid path and means actuating said second valve means to a position opening said fluid path upon removal of said filter assembly from said tubular member.

References Cited

UNITED STATES PATENTS

| | | |
|---|---|---|
| 1,782,702 | 11/1930 | Wheeler. |
| 2,544,244 | 3/1951 | Vokes. |
| 2,704,156 | 3/1955 | Botstiber. |
| 3,244,282 | 5/1966 | Rosaen. |
| 3,273,715 | 9/1966 | Rosaen. |
| 3,288,287 | 11/1966 | Rosaen. |
| 3,313,418 | 5/1967 | Rosaen. |
| 3,326,375 | 6/1967 | Rosaen. |
| 3,333,697 | 8/1967 | Rosaen. |
| 3,368,679 | 2/1968 | Bozek. |
| 2,728,460 | 12/1955 | Collis et al. _____ 210—234 X |
| 2,793,752 | 5/1957 | Jay _____ 210—234 X |
| 3,368,680 | 2/1968 | Bozek _____ 210—91 X |

SAMIH N. ZAHARNA, *Primary Examiner.*